United States Patent [19]

Shanks

[11] 4,318,161

[45] Mar. 2, 1982

[54] SNAP IN COUPLING ASSEMBLY FOR A VEHICLE HEADLAMP HAVING A TRIM RIM INTEGRAL THEREWITH

[75] Inventor: Bruce E. Shanks, Chesterland, Ohio

[73] Assignee: General Electric Company, Schenectady, N.Y.

[21] Appl. No.: 85,353

[22] Filed: Oct. 16, 1979

[51] Int. Cl.³ .............................................. H01R 33/00
[52] U.S. Cl. ...................................... 362/226; 362/61; 362/306
[58] Field of Search ......................... 362/61, 226, 306

[56] References Cited

U.S. PATENT DOCUMENTS

| | | | |
|---|---|---|---|
| 1,114,976 | 10/1914 | Fischer | 362/306 X |
| 2,749,434 | 8/1956 | Falge. | |
| 3,696,238 | 10/1970 | Szymanski | 362/61 X |
| 3,710,097 | 1/1973 | Bright et al. | |
| 4,103,323 | 7/1978 | Urbanek | 362/306 |

FOREIGN PATENT DOCUMENTS

| | | | |
|---|---|---|---|
| 2410073 | 9/1975 | Fed. Rep. of Germany | 362/326 |
| 1958761 | 11/1978 | Fed. Rep. of Germany | 362/61 |
| 2910489 | 10/1979 | Fed. Rep. of Germany | 362/61 |
| 1203574 | 3/1958 | France | 362/226 |
| 2280026 | 2/1976 | France | 362/306 |

*Primary Examiner*—Peter A. Nelson
*Attorney, Agent, or Firm*—Lawrence R. Kempton; Philip L. Schlamp

[57] ABSTRACT

This invention relates to polymer sealed beam headlamp units having rims integral therewith, and more particularly to a unitary coupling assembly for securing these headlamp units to vehicles. The assembly includes an integrally rimmed headlamp having a plurality of couplers secured thereto. The couplers are integrally molded with the rim or attached thereto. The couplers have curved mating surfaces, centered about point for pivotal movement, which engage the surfaces of complementary couplers secured to a vehicle. The couplers are lockingly secured to each other and form a coupling for attaching the lamp to a vehicle. In a preferred embodiment the assembly employs adjustable couplers for the adjustable and/or preaimed attachment of a headlamp to a vehicle.

10 Claims, 4 Drawing Figures

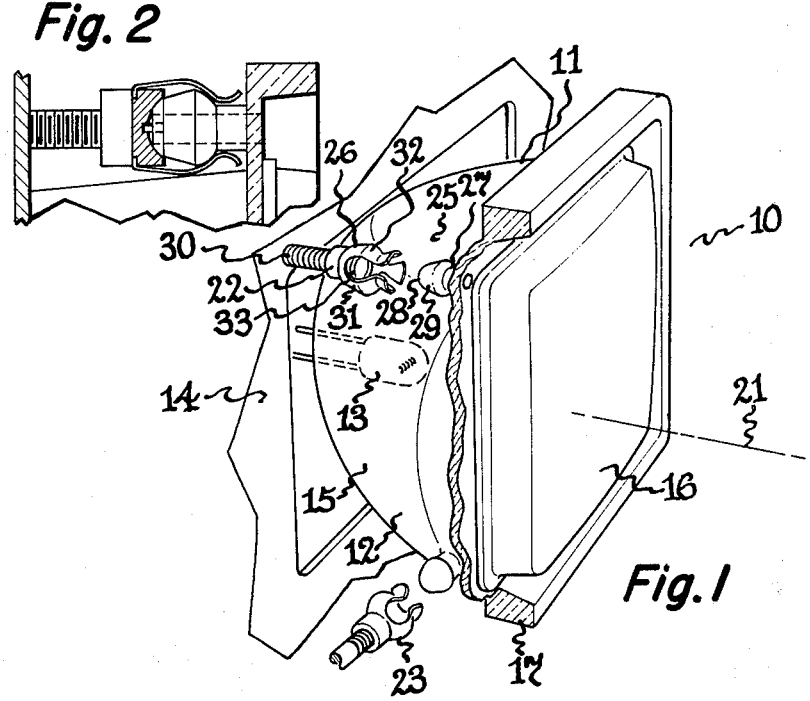
Fig. 2
Fig. 1
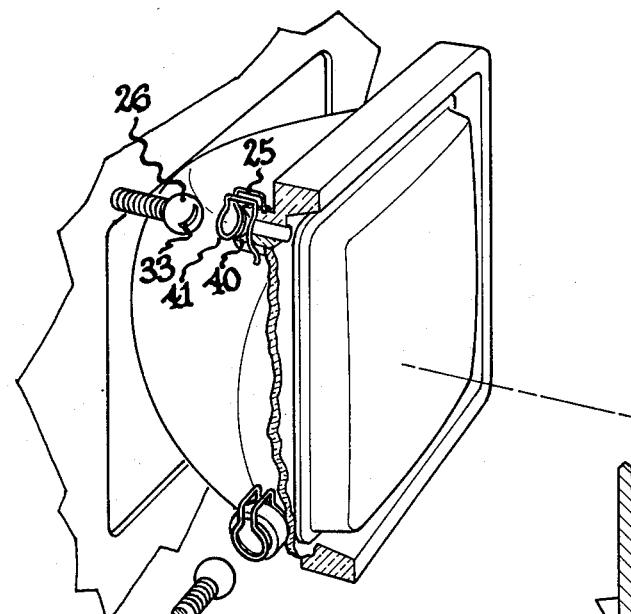
Fig. 3
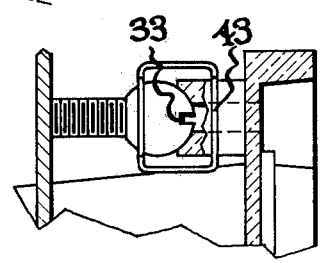
Fig. 4

SNAP IN COUPLING ASSEMBLY FOR A VEHICLE HEADLAMP HAVING A TRIM RIM INTEGRAL THEREWITH

This application relates to co-pending applications Ser. Nos: 85,454, Oct. 16, 1979, 896,707, Apr. 17, 1978, U.S. Pat. No. 4,210,841, issued July 1, 1980, 85,369, Oct. 16, 1979, 85,353, Oct. 16, 1979, 85,368, Oct. 16, 1979, the disclosures of which are incorporated herein by reference.

This invention relates to polymer sealed beam headlamp units having rims integral therewith, and more particularly to a unitary coupling assembly for securing these headlamp units to vehicles. The assembly includes an integrally rimmed headlamp having a plurality of couplers secured thereto. The lamp couplers are integrally molded with the rim or attached thereto. The couplers have curved mating surfaces, centered about point for pivotal movement, which engage the surfaces of complementary couplers secured to a vehicle. The couplers are lockingly secured to each other and form a coupling for attaching the lamp to a vehicle. In a preferred embodiment the assembly employs adjustable couplers for the adjustable and/or preaimed attachment of a headlamp to a vehicle.

Heretofore sealed beam headlamps have employed a separate trim ring for structurally and decoratively interfacing the lamp with a vehicle. The trim ring is generally metal and is clamped about the lens-reflector interface of the lamp envelope. The trim ring is subsequently secured to a mounting bracket for attaching the lamp unit to a vehicle. The trim ring-mounting bracket arrangement merely secures the lamp to the vehicle. It does not precisely and referentially relate the beam axis of the lamp to the vehicle. A headlamp which is attached to a vehicle by a trim ring mounting bracket arrangement must be aimed subsequent to its attachment by turning the horizontal and vertical adjustment screws located on the assembly. The mountings are complicated and employ a considerable number of heavy metal parts which add substantially to both vehicle weight and cost. The labor costs of aiming and attaching a headlamp by these mounting arrangements are substantial and further contribute to vehicle costs.

The present invention provides an inexpensive headlamp assembly which securely couples a lamp directly to a vehicle and eliminates the need for more complicated constructions. The assembly provides a simple low cost mounting which utilizes a minimum number of parts and enables the one step attachment and aiming of a headlamp. The assembly further provides for the snap fit assembly of the headlamp to the vehicle to reduce labor costs. The assembly further provides a trim rim integral with the headlamp for structurally and decoratively interfacing a lamp with a vehicle.

The mounting assembly of the present invention and alternate embodiments thereof provide a preaimed lamp assembly which eliminates adjustment of the lamp after it has been attached to the vehicle and hence reduces assembly costs.

The vehicle headlamp assembly also exhibits improved shock and vibration absorption characteristics as compared with those of customary mounting arrangements.

The assembly in a preferred embodiment comprises a polymer sealed beam lamp unit having a trim rim integrally secured to the exterior thereof. The lamp unit comprises a reflector having a light transmissive face sealed thereto for forming an envelope. A light source is sealed within the envelope and focused relative thereto for producing a desired beam pattern. A plurality of couplers are directly and fixedly secured to the rim in a triangular configuration. Each of the couplers has a curved mating surface which is substantially centered about a point for pivotal movement. The pivot points in combination define a plane substantially perpendicular to the axis of the beam. The individual couplers are alternately molded integral with the rim or attached thereto by fasteners or cement.

The pivotal surfaces of the lamp couplers secured to the rim lockingly engage the mating surfaces of complementary couplers secured to a vehicle and thereby fixedly attach the lamp to the vehicle.

Either or both the lamp and vehicle couplers can be adjustable, and, as is apparent, a variety of pivotal couplers can be employed in the assembly of the present invention.

In a preferred embodiment, the engaged complementary couplers form a coupling which is generally described as a ball and socket joint. Coupling provides a low cost light weight assembly which predeterminedly aligns a lamp within a vehicle. The coupling thus provides a snap fit connection which thereby reduces material and labor costs.

In these embodiments the couplers structurally and decoratively interface the lamp and the vehicle. In still further embodiments either some or all of the vehicle and rim couplers are adjustable to enable optical alignment or realignment of the lamp relative to the vehicle. Particularly, by referentially locating the light source relative to the rimmed lamp envelope; having the lamp couplers referentially secured to the rim, and knowing the referential disposition of the vehicle couplers, it is possible to optically preaim the lamp assembly prior to its application to vehicle. Rimmed replacement lamps are also preaimed or adjustably preaimed by the assembly of the present invention. Additional means is provided for use in combination with the coupling assembly for securing the lamp coupling and aim.

These other objects and features and a more complete understanding of the aspects of this invention will be apparent from the following detailed description which taken in conjunction with the drawings represents a preferred embodiment of this invention.

DESCRIPTION OF THE DRAWINGS

FIG. 1 is an exploded side perspective view of an embodiment of the rimmed headlamp coupling assembly of the present invention for securing a rectangular polymer headlamp to a vehicle.

FIG. 2 is a cross sectional view of a coupling employed in the assembly of FIG. 1.

FIG. 3 is an exploded side perspective view of an alternate embodiment of the rimmed headlamp assembly of the present invention for securing a rectangular polymer headlamp to a vehicle.

FIG. 4 is a cross sectional view of a coupling employed in the assembly of FIG. 3.

DETAILED DESCRIPTION

Referring now to FIG. 1, a headlamp assembly 10 in accordance with the present invention is shown in an exploded side perspective view. A rimmed polymer lamp unit 11 comprising a sealed envelope 12 having a light source 13 sealed therein and focused relative thereto, produces a light beam having an axis substantially parallel to the axis of the lamp. The headlamp assembly of the present invention secures the unit 11 to a vehicle 14 such that a desired illumination pattern is directed ahead of the vehicle 14. In particular embodiments of the present invention, the headlamp assembly 10 securely and/or demountably and/or adjustably couples the lamp unit 11 to the vehicle 14 such that the lamp beam is aimed relative to the vehicle 14.

More particularly the headlamp unit 11 comprises a light source 13 sealed within an envelope 12, a reflector portion 15 which is particularly configured and reflectorized for the directional control of reflected light and a further portion of which is configured as a light transmissive face or lens 16. Lamps of this type are disclosed in copending application Ser. No. 896,707 assigned to the assignee of the present invention, the disclosure of which is incorporated herein by reference. The envelope 12 and the integral rim 17 are formed from polymer materials.

The beam pattern produced by the lamp unit 11 is the combined result of the interaction between the light source 13 the envelope 12. Specifically, the light source 13 is positioned within the envelope 12 to achieve an optically optimal light distribution and hence the light source 13 is focused relative to the envelope 12 regardless of whether the light source 13 is located at the exact geometric focus of the conical reflector 15. In particular, the light source 13 is focused relative to the reflector 15 alone or alternatively is focused relative to the reflector 15 and lens 16 in combination. In the former instance an optimal beam pattern is established by the reflector 15 which is subsequently modified by the lens prescription. The reflector 15 thus structurally references the beam without regard for lens tolerances. The beam axis thus substantially coincides with the lamp axis. In the latter case, the light source 13 is adjusted within an envelope 12 comprising both a lens 16 and reflector 15 to produce an adequate beam pattern. Although the envelope focused beam pattern is inherently less precise than the reflector focused beam pattern the beam axis remains substantially parallel to the optical axis of the envelope.

In either of the above cases the lamp beam is characterized by a plane which is approximately orthogonal to the beam axis (Z axis, axis in the major direction of its propogation). The reference plane is defined conventionally, by the forward surfaces of the reference beads located on the face of a lamp. The bead surfaces are ground to definitely establish a reference plane which orthogonally characterizes the lamp beam. In particular, three beads are employed on the lamp face wherein the surface of three beads determines the reference plane.

The headlamp assembly 10 of the present invention eliminates the need for reference beads and is equally applicable to either the above-focused headlamps although a preferred embodiment employs the focused reflector lamp unit inasmuch as the focused reflector unit optimizes the light output of the lamp and enables the exterior surface of the reflector to be used as a reference.

The assembly 10 rigidly disposes the lamp unit 11 in the X-Y plane while the Z disposition of the unit is either rigid, adjustable or resilient.

The headlamp assembly 10 is generally comprised of a plurality of discrete couplings which are secured to the lamp rim 17 which is integral with and projects radially outward from the lens-reflector interface of the envelope 12. The couplings comprise complementary rim and vehicle couplers which are lockingly secured to each other. Although one or two complex-multi axis couplings can be employed in alternate embodiments of the headlamp assembly 11, three single axis couplings are preferred to inexpensively and rigidly dispose the lamp unit 11 in a securely aimed position relative to the vehicle 14. In alternate embodiments, the individual couplers are adjustable or non adjustable, integral with or attached to their respective structures. In particular, the rim couplers are secured directly to the rim 17 which is integral with the lamp unit 11. Generally the axis of the couplers is parallel to the beam axis although the axis of one or more couplers can be for instance perpendicular to the beam axis.

In FIG. 1, an exploded side view of the coupling assembly 10 of the present invention is disclosed wherein three couplings 21, 22 and 23 directly attach the rimmed lamp unit 11 to the vehicle 14 in a triangular, planar reference such that the lamp beam is aimed relative to the vehicle to produce the desired forward illumination.

An individual coupling, for instance coupling 22, is either stationary or adjustable and comprises a rim coupler 25 and a complementary vehicle coupler 26.

The rim coupler 25 is integrally molded with the rim 17 of the lamp unit 11 or attached thereto by cement and/or other fastener. The rim coupler 25 as shown is referentially disposed relative to the rim 17 which is referentially disposed relative to the envelope 12. The rim coupler 25 generally comprises a curved mating surface 28 for lockingly engaging the complementary mating surface 31 of a vehicle coupler 26 to lockingly secure the lamp unit 11 to the vehicle 14. The curved mating surfaces 28 and 31 are substantially centered for pivotal movement about a point. The pivot points of the couplings 21, 22, and 23 taken in combination define a reference plane substantially perpendicular to the axis of the beam. Specifically the pivot points are not constrained to be points within the interior of couplers 25 or 26 but are any points which establish a reference plane which is substantially perpendicular to the beam axis. Accordingly, the couplers 25 and 26 and their respective mating surfaces 28 and 31 can be formed in a number of different configurations provided the configuration is centered about a point. In a preferred embodiment, the surfaces 28 and 31 are curved to facilitate pivotal movement of the couplers 25 and 26 during adjustment.

In the particular embodiment shown in FIG. 1, which is illustrated in more detail in FIG. 2, the rim coupler 25 comprises a support 27 and a conical boss 29 having a substantially spherical mating surface 28 for engaging a similar portion of the vehicle coupler 26.

The vehicle coupler 26 comprises a cylindrical shaft 30 having an anterior receptacle 32 which complements and snuggly receives the rim coupler 25 therein to lockingly secure the lamp unit 11 to the vehicle 14. The cylindrical shaft 30 is permanently or adjustably secured to the vehicle 14 by, for instance, welding or threading the shaft to the vehicle 14. The vehicle coupler 26 is shown as being threadably adjustable. The cylindrical shaft 30 is threaded at its posterior end to snuggly engage an opening in the vehicle 14. The receptacle 32 has a notch 33 in its interior surface for receiving a tool therein for axially rotating the vehicle coupler 26 such that the vehicle coupler 26 and particularly the receptacle 32, having the rim coupler 25 secured thereto, is axially moved closer to or farther from the vehicle 14. The referential disposition of the lamp 11 relative to the vehicle 14 is thus adjusted and hence the lamp beam is aimed or reaimed relative to the vehicle 14. An access channel 34 through the rim coupler 25 enables the vehicle coupler to be adjusted from the front of the assembly 11.

In this embodiment it is possible to preadjust the vehicle couplers such that the referential positioning of the vehicle couplers is known and the headlamp 11 is preaimed relative to the vehicle 14.

Referring now to FIG. 3 and 4, the rim coupler 25, in an alternate embodiment, is shown as a cavity 40 having a partially spherical interior mating surface and a bail keeper 41 about its exterior edge. The cavity 40 as shown, is molded integral with the rim 17. In an alternate embodiment the rim coupler 25 is a clamp or other receptacle which is attached to the rim 17 by cement or other fastener. The bail keeper 41 is a wire frame which lockingly engages the outer edges of the cavity 40 and resiliently restrict the opening thereto. More particularly, the edges of the keeper 41 are embedded in the surface of the lamp unit 11 with the intermediate portions of the keeper 41 at least partially restricting the cavity opening. The keeper 41 resiliently spreads to permit insertion of a vehicle coupler 26 within the cavity 40. In an alternate embodiment the keeper 41 is applied to the cavity 40 after the vehicle coupler 26 has been inserted therein. The edges of the keeper engage for instance grooves 43 and 44 about the edge of the cavity 40. In the former situation the keeper 41 becomes a part of the lamp unit 11 as it is produced and accordingly is rigidly secured thereto. As before an access opening 34 is provided with a channel through the rim coupler 25 to permit access to the enclosed vehicle coupler for adjustment thereof.

In a preferred embodiment, the above described couplers have axes which are parallel or substantially parallel to the optical axis of the lamp. Adjustment of the couplers therefore does not bind the couplings or damage the lamp. However, in an alternate embodiment, one or more of the couplings are pivotal joints having axes substantially perpendicular to the axis of the lamp. These couplings are non adjustable and provide a stop support.

The locking engagement of some or all of the couplings 21, 22 and 23 is enhanced by the addition of a retaining means which lockingly engages the exterior surface of the couplings. Although a variety of different retaining means may be employed in connection with the couplings of the present invention, it is advantageous to employ a removable retaining means such that the couplings can be disengaged to demount the headlamp for instance for replacing the lamp unit.

In a preferred embodiment the couplings 21 and 22 are adjustable while the third coupling 23 is pivotal. The headlamp 11 is first snapped onto the coupling 23 and subsequently snapped onto the couplings 21 and 22. The headlamp 11 is thus rigidly disposed within the vehicle 14 in a triangular, planar reference such that the lamp unit 11 is aimed relative to the vehicle 14. Adjustment of the couplings 21 and 22 permits further reaiming or alignment of the beam to provide the desired illumination ahead of the vehicle.

The system of three couplings has particular utility in that a minimum number of couplers is employed to attach and aim the headlamp 11. More particularly, if the pivot points of couplings 21 and 23 are in a line parallel to the horizontal axis of the reference plane of the lamp, adjustment of coupling 22 rotates the lamp unit 11 about this axis such that the beam is moved up or down along the vertical axis. Similarly, the pivot points of couplings 22 and 23 establish an axis about which coupling 21 rotates the lamp. Coupling 21 is dedicated to horizontal adjustment inasmuch as it is located at the corner of the lamp unit adjacent to pivotal coupling such that couplings 22 and 23 have point contacts along an axis parallel to the vertical axis of the lamp.

It will be appreciated that the present invention provides an extremely quick simple and economical assembly for mounting a lamp to a vehicle foward structure. Although the present invention has been described with reference to a seal beam lamp unit, it is readily apparent that the coupling assembly of the present invention may be used in combination with a variety of lamp units where a precise positioning is needed. In the particular vehicle structure environment of the present lamp assembly, the present coupled headlamp assembly yields surprising advantages. The assembly provides for a quick and inexpensive means for demountably and fixedly attaching a lamp unit to the forward structure of a vehicle. Further, in alternate embodiments of the present invention, the lamp unit assembly can provide for the adjustable and aimable positioning of the lamp unit relative to the forward vehicle structure.

Although the invention has been described in its preferred form with a certain degree of particularity, it is understood that the present disclosure of the preferred embodiment is made by way of example and that various modifications in the details of construction may be resorted to without departing from the true spirit and scope of the invention. It is intended that the patent shall cover, by suitable expression in the appended claims, whatever features of patentable novelty exist in the invention disclosed.

I claim:

1. A sealed beam vehicle headlamp assembly comprising a lamp unit having a light source sealed within and focused relative to an envelope including a reflector and a light transmissive lens for producing a light beam having an axis substantially parallel to the optical axis of said lamp unit, a rim integrally molded with said envelope, three couplers directly and fixedly secured to said rim in a triangular configuration, each of said couplers having a curved mating surface which is substantially centered for pivotal movement about a point, the points defining a plane transverse to the axis of said beam.

2. The vehicle headlamp assembly of claim 1 wherein said couplers define a plane substantially perpendicular to the axis of said beam.

3. The vehicle headlamp assembly of claim 2 wherein said couplers are integral with said rim.

4. The vehicle headlamp assembly of claim 1 wherein said couplers are integral with said rim.

5. The vehicle headlamp assembly of claim 1 wherein said couplers include receptacles for recessively receiving and engagingly securing complementary vehicle couplers.

6. The vehicle headlamp assembly of claim 1 wherein said lamp couplers are fixed in relation to said lamp unit and include adjustment access openings therethrough.

7. The vehicle headlamp assembly of claim 1 wherein said lamp couplers include bosses for entrantly and lockingly engaging complementary vehicle couplers.

8. The vehicle headlamp assembly of claim 1 wherein said lamp couplers are adjustable relative to said lamp unit.

9. The vehicle headlamp assembly of claim 1 wherein the axes of at least two of said couplers are substantially parallel to the optical axis of said lamp.

10. The vehicle headlamp assembly of claim 1 wherein the axis of at least one coupler is perpendicular to the beam axis.

* * * * *